Patented Oct. 26, 1948

2,452,254

UNITED STATES PATENT OFFICE 2,452,254

LIQUID POLYMERIC DIMETHYL SILICONES

Rob Roy McGregor, Verona, and Earl Leathen Warrick, Pittsburgh, Pa., assignors to Corning Glass Works, Corning, N. Y., a corporation of New York No Drawing. Application April 2, 1945, Serial No. 586,270

11 Claims. (Cl. 260—448.2)

This invention relates to the preparation and use of liquids having lubricating properties and specifically characterized by high resistance to oxidation, little change of viscosity with temperature and low pour point, as determined by the A. S. T. M. standard method for lubricants.

This application is a continuation-in-part of our copending applications, Serial Number 432,530, filed February 26, 1942 (now Patent No. 2,384,384, patented September 4, 1945), and Serial Number 481,143, filed March 30, 1943 (now Patent No. 2,437,204, patented March 2, 1948), both of said applications being assigned to the assignee of the present invention.

The lubricants in common use are for the most part petroleum oils. While they have a wide range of use they have certain inherent defects which make them inapplicable or only poorly applicable under certain conditions. The most evident of these defects are their ease of oxidation or inflammability, instability at high temperature as evidenced by acid formation and viscosity increase, inability to lubricate at low temperatures, and their great change of viscosity with change of temperature. Liquids which do not have these defects would be useful in fields where abnormal or subnormal temperatures are to be encountered or where high concentration of oxygen makes the use of petroleum oils hazardous, and the provision of such liquid is the primary object of this invention.

Other objects will be perceived in the following description of our new liquids, their constitution, properties and uses and the methods by which they may be produced, all of which contribute to the various embodiments of our invention.

We have found that many desirable features rendering it suitable for the above mentioned and other purposes are possessed by an organosilicon oxide of the class known as silicones, more specifically dimethyl silicone. In the chemical literature the term "silicone" refers to those silicon compounds in which two organic groups are combined with silicon and oxygen according to the general formula $R_2SiO$, R being an organic radical. In other words, the silicones are diorgano silicon oxides. The silicones in general are polymeric and their unit structure is

The term "silicone," as used herein, excludes the mono-organo silicon oxides in which only one organic radical is attached to the silicon atom and which are highly polymeric and are represented by the unit structure

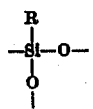

As a further distinction over instances where "methyl silicone" is used to include the monomethyl compound, the term "dimethyl silicone" will be used herein to designate the substantially dehydrated compound $(CH_3)_2SiO$ having the polymeric unit structure

The dimethyl silicone liquid produced by our method and comprising a mixture of the polymers thereof has an unusually low pour point and, when freed from its lowermost polymers by our method, it is remarkably resistant to further polymerization at elevated temperatures. For these reasons it maintains a relatively consistent viscosity throughout a wide range of temperatures and its change of viscosity with temperature is much less than is the case with hydrocarbon oils.

PREPARATION OF DIMETHYL SILICONE LIQUIDS

1. Pure dimethyl diethoxy silicane, $$(CH_3)_2Si(OC_2H_5)_2$$

is prepared in accordance with the method described and claimed in our copending application Serial Number 416,285, filed October 23, 1941 (now Patent No. 2,380,057), which comprises reacting nascent methyl magnesium Grignard with ethyl orthosilicate, $Si(OC_2H_5)_4$, under pressure and fractionally distilling the product. More specifically, one mol equivalent of metallic magnesium is added to one mol equivalent of ethyl orthosilicate in a pressure tight vessel. Methyl chloride gas is passed in until the ethyl orthosilicate is saturated therewith and a few cc. of ethyl bromide and a few crystals of iodine are then added to initiate the reaction, after which the reaction vessel is sealed and methyl chloride is again passed in until a total of one mol equivalent thereof has been added. At the same time the reaction mixture is stirred and heat and pressure are developed. After some time the temperature and pressure subside, indicating that the reaction has ceased, and the products of the reaction corresponding to the equation $$CH_3Cl + Si(OC_2H_5)_4 + Mg \rightarrow$$
$$(CH_3)Si(OC_2H_5)_3 + C_2H_5OMgCl$$
$$CH_3Cl + CH_3Si(OC_2H_5)_3 + Mg \rightarrow$$
$$(CH_3)_2Si(OC_2H_5)_2 + C_2H_5OMgCl$$

are fractionally distilled. The boiling point of the dimethyl diethoxy silicane is 112° C. and the separation from the other components of the mixture is relatively easy.

2. A pure dimethyl diethoxy silicane, preferably dissolved in ethyl alcohol, is hydrolyzed with water. The hydrolysis may be conducted in various ways and, although the resulting liquid will invariably have the same chemical composition, its chemical structure and the physical properties dependent thereon can be varied substantially. In general, the use of a catalyst for promoting hydrolysis and the use of heat during hydrolysis or during the subsequent drying of the product will increase its viscosity.

Preferably, hydrolysis is carried out in the presence of an acid catalyst by mixing one volume of the dimethyl diethoxy silicane with one volume of a mixture of 95% ethyl alcohol and concentrated aqueous hydrochloric acid in equal parts. Although any acid may be used, we prefer to use acids which are easily removed by washing or which are decomposed by heat, such as, hydrochloric, oxalic, acetic or trichloracetic acids. Any concentration of acid may be used and for a given acid the higher the concentration the higher the viscosity of the resulting liquid.

The temperature at which the hydrolysis is carried out will also affect the viscosity of the resulting liquid and the higher the temperature the higher the viscosity or the more speedily does the liquid attain a given viscosity. Hydrolysis may be effected at room temperature in about eighteen hours but, preferably, the reaction mixture is refluxed for about four to eight hours after which it is poured into water and the product separates. The oily layer is washed free from acid and alcohol and is thereafter dried.

Drying may be accomplished without the use of heat by treating the liquid at room temperature with a drying agent such as anhydrous sodium sulfate. When thus dried, the liquids which result from hydrolysis at room temperature have a viscosity of about 100 Saybolt seconds at 25° C. Liquids prepared without the use of a catalyst and without the application of heat will have still lower viscosities. If desired, the liquids may be dried and partially dehydrated by heating them at about 120° C., or over, preferably under reduced pressure whereby the viscosities may range from 200 to 1000 or more Saybolt seconds at 25° C., the viscosity increasing with time and/or temperature of drying. Control of viscosity by heating will be hereinafter more fully described.

3. A polymeric dimethyl silicone liquid was prepared as follows: A mixture consisting of the following:

| | Per cent by volume |
|---|---|
| Dimethyldiethoxysilane | 50 |
| Concentrated HCl | 25 |
| 95% ethyl alcohol | 25 | was refluxed. The reflux was stopped at one hour and the product was washed with water. Heating and stirring in a low pressure air stream served to dry and at the same time to remove some low polymers from the liquid. The resulting liquid has a viscosity of 212 Saybolt seconds at 30° C., a flash point of 118° C., and an average molecular weight of 1100. Column treatments served to raise the flash point, the viscosity and the average molecular weight of the liquid as noted in table I, given below. The column treatment comprises flowing the liquid down the interior of an electrically heated vertical column or tube packed with glass helices against a counter-current of inert gas such as nitrogen, carbon dioxide, etc. Atmospheric or reduced pressure may be employed.

Table I

| | Column Temperature | Viscosity Saybolt Sec. at 30° C. | Flash Point | Avg. Mol. Wt. After Treatment |
|---|---|---|---|---|
| | ° C. | | ° C. | |
| Liquid after drying | | 212 | 118 | 1,100 |
| First Treatment | 185 | 310 | 157 | 1,300 |
| Second Treatment | 215 | 310 | 182 | 1,300 |
| Third Treatment | 245 | 344 | 244 | 1,500 |

The time exposure of the liquid was about one minute. The column treatments were carried out under reduced pressure (150 mm.) with small amounts of $CO_2$ bled in from dry ice in a Dewar flask. By exposing the liquid having the viscosity of approximately 212 Saybolt seconds to the above column treatments for the proper length of time, i. e. of the order of one minute, more or less, it is possible to prepare liquids having any desired viscosity between 212 and 344 Saybolt seconds and any desired flash point between 118° C. and 244° C., and any desired molecular weight between 1100 and 1500.

Instead of the relatively brief column treatment described above, the liquid may be held at the desired temperature under reduced pressure and inert gas bubbled therethrough. This not only raises the flash point but, if continued long enough, also causes a substantial increase in viscosity. In fact, the viscosity may be raised to any value above 344 Saybolt seconds up to approximately 2000 Saybolt seconds by varying the time of treatment. At the same time, the average molecular weight is likewise progressively increased. For example, a sample having a viscosity of 1190 Saybolt seconds (25° C.) and a flash point of 213° C. was held at a temperature of 210° C. and a pressure of 200 mm. while $CO_2$ was bubbled through it. After two hours the viscosity was 1660 Saybolt seconds (25° C.) and the flash point was 300° C.

4. Dimethyldiethoxysilane was mixed with 34% by volume of 85% sulfuric acid. After being stirred for five minutes, its viscosity was 720 Saybolt seconds at 30° C. when washed free of acid. By continuing the treatment with sulfuric acid for a sufficient time, it is possible to prepare a dimethyl silicone liquid having any desired viscosity up to 15,000 Saybolt seconds at 30° C. and even higher.

5. Liquid dimethyl silicone of about 900 Saybolt seconds viscosity was prepared by the hydrochloric acid-alcohol method of section 3 above. The liquid was placed in a thermostatically controlled bath at 30° C. To this liquid was added 5.5% by weight of 98% sulfuric acid and the mixture was stirred at 30° C. for four hours. The resulting product was then poured into about 5 to 10 volumes of water and stirred. It was then allowed to stand for one hour with intermittent stirring, after which it was taken up in benzene and washed three times with cold water, three times with dilute ammonia, three times with cold water and three times with warm water. The benzene solution was then placed in a distilling flask and the benzene taken off on a water bath while a stream of carbon dioxide was passed through. Following this, any low polymers were removed by raising the temperature to 230° C. while carbon dioxide was passed through. The viscosity of the product was 578,100 Saybolt seconds at 30° C. and its pour point was below —45° C.

By shortening the time of treatment with sulfuric acid, dimethyl silicone liquids of viscosities between 900 Saybolt seconds and 578,100 Saybolt seconds were obtained. Or by continuing the treatment beyond four hours, liquids up to and over 1,000,000 Saybolt seconds at 30° C. were obtained. Liquids which exhibited little or no flow at room temperature were obtained when the treatment was continued for sufficient time.

The speed with which a liquid of given viscosity was obtained was varied by varying the amount of 98% sulfuric acid employed and the temperature of treatment. Larger amounts of acid accelerated the polymerization and higher temperatures did likewise. It is preferable not to let the temperature rise too high since oxidation of methyl radicals by the sulfuric acid may take place.

CHEMICAL STRUCTURE AND PROPERTIES

The liquids prepared by the above described processes are mixtures of dimethyl silicone polymers having the unit structure hereinbefore referred to. They are soluble in organic solvents such as benzene, toluene, etc. Analysis for carbon and silicon showed that these polymers had a $CH_3/Si$ ratio of 2.0.

The above liquids ranging from liquids having approximately 200 Saybolt seconds viscosity at 30° C. to compositions having little or no flow at room temperature have pour points less than —40° C., in many instances as low as —65°, and in some instances lower. They may also be heated above 350° C. without decomposition. They may be heated at elevated temperatures for long periods without gelation. For example, they remain liquid and soluble when heated at 120° C. for four days or more in air.

The flash point of the liquids range between approximately 100° C. and as high as 350° C., depending upon their degree of polymerization and the amount of low molecular weight volatile polymers that are present. For many purposes, particularly where high flash point was desired, it has been found advisable to remove these low polymers by distillation up to 150° C. at 4 mm. pressure. The resulting liquids not only have higher flash points and higher viscosities but also their viscosity-temperature coefficients are greatly improved.

In general, the above described liquids exhibit relatively small change in viscosity as the temperature is varied as compared with petroleum oils. When petroleum oils are concerned, the relative changes of viscosity with temperature are described numerically as a certain kinematic viscosity index (K. V. I.). The equation for determining this figure is based on the known properties of standard petroleum oils at 210° F. and 100° F. It is strictly valid only when giving an answer between 0 and 125. It takes no account of viscosities below 100° F. The K. V. I. of the dimethyl silicone liquids of our invention lies generally in the neighborhood of 175 to 200, and their useful properties are evident down to at least —40° C. We prefer to describe the viscosity-temperature coefficient or the change of viscosity with temperature as the slope of the line given by plotting the logarithms of the viscosity $\eta$, as ordinates against the reciprocals of the absolute temperatures as abscissae. The lower the value of the slope between given temperatures, the smaller the change in viscosity of the material between these temperatures. The slope of a common petroleum oil "Gulf Pride 40" in terms of $$\frac{\Delta \log \eta}{\Delta 1/T}$$

for the temperature interval 100° to 25° C. is 2218; for the temperature interval 25° to —50° C. is infinity. The slopes of our new liquids similarly expressed for the temperature intervals 100° to 25° C. are in general less than about 1000 and in some instances as low as approximately 600; for the temperature interval 25 to —50° C., they are in general less than 2000 and in many instances less than 1000.

USES

These liquids are useful as lubricants and as hydraulic fluids. Their small change of viscosity with temperature means that small changes of energy suffice to transmit pressure under different temperature conditions. The low pour point and high decomposition point indicates that they are useful over a very wide temperature range. They are also useful as damping media for delicate instruments and for recoil mechanisms or shock absorbing devices not only on account of their low temperature-coefficient of viscosity but because a wide range of viscosities is obtainable. We have found that the liquids of our invention having viscosities between about 5000 and 250,000 Saybolt seconds at 30° C. and being substantially free of polymers distillable up to 150° C. at 4 mm. are particularly useful for the above applications.

Rubber does not swell, shrink nor become embrittled when in contact with liquid dimethyl silicone for extended periods of time, amounting to as much as a year or more. Consequently, these versatile liquids are adapted to be used in situations wherein common lubricating oils are entirely unsuitable, such as the lubrication of rubber bearings.

The wide range of temperatures over which they remain liquid makes our new products useful as heat transfer media or as thermostat fluids. They may be used as circulating liquids for high or low temperature maintenance, or as the heat transfer media in high or low thermostatic baths.

Measurement of the power factor of liquids prepared according to this invention showed this to be 0.05%. Consequently, such liquids can be used as the fluid filling medium for electrical power transformers.

We claim:

1. A fluid composition composed of a mixture of liquid polymeric dimethyl silicones having two methyl radicals attached to each silicon atom and a viscosity above 200 Saybolt seconds at 30° C.

2. A fluid composition composed of a mixture of liquid polymeric dimethyl silicones having two methyl radicals attached to each silicon atom and a viscosity above 200 Saybolt seconds at 30° C., a flash point above 120° C. and an average molecular weight above 1100.

3. A fluid composition composed of a mixture of liquid polymeric dimethyl silicones, having two methyl radicals attached to each silicon atom and having a viscosity between about 200 Saybolt seconds and 15,000 Saybolt seconds at 30° C.

4. A fluid composition composed of a mixture of liquid polymeric dimethyl silicones having two methyl radicals attached to each silicon atom and a viscosity above 200 Saybolt seconds at 30° C., said silicones being substantially free of polymers distillable up to 150° C. at 4 mm. pressure.

5. A fluid composition composed of a mixture of liquid polymeric dimethyl silicones having two methyl radicals attached to each silicon atom and a viscosity between about 5,000 and 250,000 Saybolt seconds at 30° C.

6. A fluid composition composed of a mixture of liquid polymeric dimethyl silicones having two methyl radicals attached to each silicon atom, a viscosity between about 200 and 350 Saybolt seconds at 30° C., a flash point between about 120 and 250° C., and an average molecular weight between about 1100 and 1500, said silicones remaining liquid when heated at 120° C. for four days.

7. A lubricant comprising a mixture of liquid polymeric dimethyl silicones having a viscosity greater than 200 Saybolt seconds at 30° C. and a viscosity-temperature coefficient, as represented by the expression $$\frac{\Delta \log \eta}{\Delta 1/T}$$

where $\eta$ is the viscosity and $T$ the absolute temperature, not greater than 1000 for the temperature interval 100 to 25° C. and not greater than 2000 for the temperature interval 25 to —50° C.

8. A lubricant comprising a mixture of liquid polymeric dimethyl silicones having a viscosity between about 5000 and 250,000 Saybolt seconds at 30° C., said silicones being substantially free of polymers distillable up to 150° C. at 4 mm. pressure.

9. A lubricant composed of a mixture of liquid dimethyl silicones having the formula $$[(CH_3)_2SiO]x$$

wherein X is an integer greater than 10.

10. A fluid composition composed of a mixture of liquid polymeric dimethyl silicones having two methyl radicals attached to each silicon atom and an average molecular weight above 1100.

11. A fluid composition composed of a mixture of liquid polymeric dimethyl silicones having an average molecular weight greater than 740.

ROB ROY McGREGOR.
EARL LEATHEN WARRICK.

REFERENCES CITED

The following references are of record in the file of this patent:

UNITED STATES PATENTS

| Number | Name | Date |
| --- | --- | --- |
| 2,129,281 | Lincoln | Sept. 6, 1938 |
| 2,258,218 | Rochow | Oct. 7, 1941 |
| 2,371,068 | Rochow | Mar. 6, 1945 |